United States Patent [19]
Schad et al.

[11] Patent Number: 5,499,916
[45] Date of Patent: Mar. 19, 1996

[54] ROTARY ACTUATED GATE VALVE

[75] Inventors: Robert D. Schad, Toronto; Edward J. Jenko, Bolton, both of Canada

[73] Assignee: Husky Injection Molding Systems Ltd., Bolton, Canada

[21] Appl. No.: 330,689

[22] Filed: Oct. 28, 1994

[51] Int. Cl.$^6$ .................................................. B29C 45/23
[52] U.S. Cl. .......................................... 425/564; 425/566
[58] Field of Search .................................. 425/562, 563, 425/564, 565, 566

[56] References Cited

U.S. PATENT DOCUMENTS

| | | | |
|---|---|---|---|
| 4,784,819 | 11/1988 | Spurr | 425/564 |
| 4,983,117 | 1/1991 | von Buren et al. | 425/563 |

Primary Examiner—Tim Heitbrink
Attorney, Agent, or Firm—Bachman & LaPointe

[57] ABSTRACT

A rotary actuated gate valve for directing melt from a channel in a manifold to a mold gate includes a valve stem extending through and rotatable within the manifold. The valve stem includes a groove in fluid communication with the channel, wherein the groove is adapted to be rotated into alignment with the mold gate and channel for allowing the melt to flow into the mold gate. The groove is also adapted to be rotated out of alignment with the mold gate and channel for blocking the melt from flowing into the mold gate. The gate valve also includes a mechanism for rotating the valve stem. Another embodiment includes a rotatable housing having a groove, which operates in a manner similar to the valve stem design.

30 Claims, 4 Drawing Sheets

ROTARY ACTUATED GATE VALVE

BACKGROUND OF THE INVENTION

This invention relates to gate valves, and more particularly, to a gate valve having a rotary opening and closing mechanism.

Many valve mechanisms used in the injection molding industry are constructed in such a way as to divide the flow of plastic as it passes through or around the valve stem. An example of this is found in U.S. Pat. No. 4,268,240, where as the plastic is transferred from the distributing plate to the nozzle, it is divided by the valve stem or rod. Thereafter, the flow is rejoined into a single path with the result that the once divided interfaces form the molded product with undesirable weld lines. These weld lines can adversely affect both the optical and performance qualities of the final molded product and it is significantly advantageous to avoid their creation when molding certain products.

U.S. Pat. No. 4,412,807 shows an apparatus in which the plastic flow channel in the nozzle is kept separate from the valve pin in an effort to avoid dividing the melt stream. The channel is of a crescent shaped cross section which is known to be less than ideal for encouraging plastic flow, especially in the opposing sharp corners. Also, when the valve pin is in the open position to let plastic material to pass into the mold cavity, it creates a stagnant area of poor plastic flow directly adjacent the front face of the pin. These areas of poor plastic flow can result in material degradation which can adversely affect the performance and physical properties of the molded product.

U.S. Pat. No. 4,925,384 shows a similar design which permits the plastic to come into contact with the valve stem but restricts it from passing around the stem to form a weld line. This design also suffers from a melt channel with sluggish flow areas and requires difficult and expensive machining processes to produce the nozzle housing, having an unusual melt channel cross section.

U.S. Pat. No. 5,104,307 shows a ball-shaped closing element at the front of a nozzle with a melt channel portion extending through it. When the ball is turned, it blocks the flow of plastic to the mold cavity. This design requires a bulky, space consuming actuation device which is not suitable for multi-cavity molding where space is restricted and requires a compact actuation means. The ball-shaped element and receptive concave portions of the nozzle are also difficult to manufacture in a manner in which plastic will not leak between them. Additionally, the ball may need to be heated due to the fact that it is attached to and driven by a component external to the heated plastic melt channel system. As such, more complexity is introduced to the overall system.

U.S. Pat. No. 3,873,656 shows a valve having taps which rotate to open or close. This is similar to the approach described above. It is not compact or easy to manufacture and has sharp edges, susceptible to damage, where it mates with the sprue channels. Also, it does not lend itself to multi-cavity molding, as the actuating mechanism would consume space better used for more molding cavities.

A rotating nozzle is shown in U.K. Patent 872,101. The entire injection unit nozzle rotates on an axis parallel to the flow of plastic as opposed to the perpendicular or angular rotation axis of the two patents mentioned previously. The nozzle front portion remains in forced contact with the delivery bushing, to prevent plastic leakage between the two. The construction shown is very bulky, consuming a substantial amount of space. The rotational drive means (not shown or described) is assumed to also require a considerable space for installation. Additionally, the mode of providing the sealing pressure against plastic leak between the nozzle and bushing is the difference in projected areas at the rear of the nozzle versus the front of the nozzle. The area of the back of the nozzle exposed to plastic is large and is expected to provide substantially enough force to keep the nozzle in positive sealing contact with the bushing. This construction is not found to be reliable or dependable as imperfections in the mating surfaces of the nozzle and bushing or debris, which precludes uniform contact between the two, will increase the projected area of pressure at the front of the nozzle and negate the sealing force.

There exists, therefore, a need for a simply constructed rotary actuated gate valve having a space efficient rotary actuated design.

SUMMARY OF THE INVENTION

The primary object of this invention is to provide a simply constructed and space efficient rotary actuated gate valve.

Another object of this invention is to provide a rotary actuated gate valve which eliminates weld seams.

Still another object of this invention is to provide a rotary actuated gate valve having noninhibited melt flow paths.

Yet another object of this invention is to provide a rotary actuated gate valve having a compact design which is particularly useful for stack mold hot runners.

And yet another object of this invention is to provide a rotary actuated gate valve which is economical to manufacture.

The foregoing objects are obtained by the inventive rotary actuated gate valve of the instant invention which includes a valve stem extending through and rotatable within a manifold. The valve stem includes a groove in fluid communication with a channel in the manifold, wherein the groove is adapted to be rotated into alignment with the mold gate and channel for allowing the melt to flow into the mold gate. The groove is also adapted to be rotated out of alignment with the mold gate and channel for blocking the melt from flowing into the mold gate. The gate valve also includes a mechanism for rotating the valve stem.

This embodiment may also include a housing having a channel for receiving the melt from the manifold channel and directing the melt to the groove. The rotating mechanism includes a portion of the housing being rotatable, connected to the valve stem and adapted to have a pressurized fluid directed there against for implementing rotation.

Another embodiment of this invention is rotary actuated gate valve comprising a rotatable housing including a groove for receiving melt from the manifold channel, wherein the groove is in fluid communication with the manifold channel. The groove is adapted to be rotated into alignment with the mold gate for allowing the melt to flow into the mold gate The groove is also adapted to be rotated out of alignment with the mold gate for blocking the melt from flowing into the mold gate. The valve also includes a mechanism for rotating the housing positioned coaxially relative to the housing.

The details of the present invention are set out in the following description and drawings wherein like reference characters depict like elements.

DETAILED DESCRIPTION OF THE PREFERRED EMBODIMENT

Figure 1:
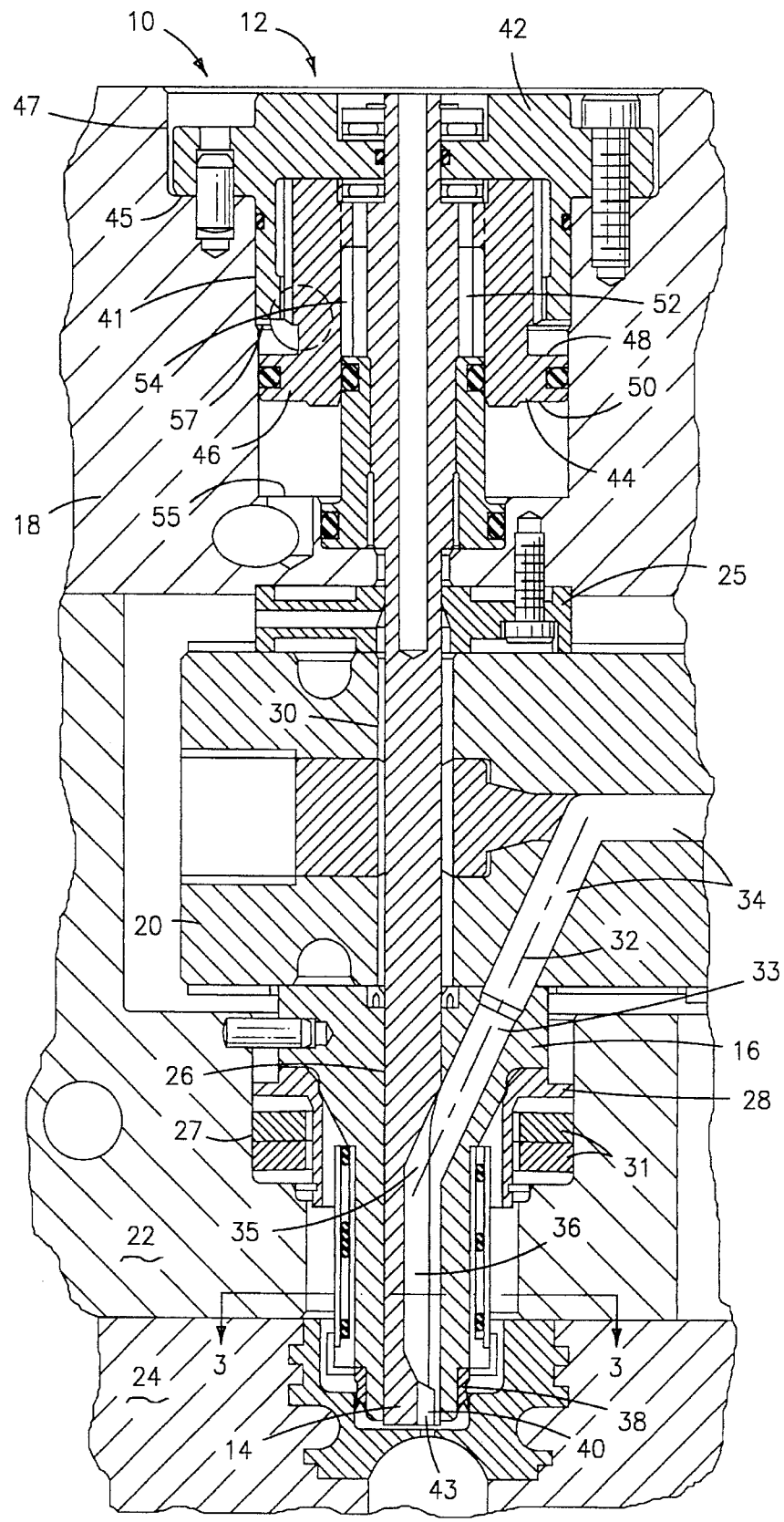
FIG. 1 is a partially cross-sectional and overhead view of the rotary gate valve of the present invention.

Referring now to the drawings in detail, there is shown in FIG. 1 an overhead and partially cross-sectional view of the rotary actuated gate valve of the present invention, designated generally as 10. Gate valve 10 is comprised generally of upper rotation mechanism 12, valve stem 14 and lower nozzle housing 16.

As can be seen in FIG. 1, gate valve 10 is adapted to be situated with its elements extending from manifold backing plate 18 through manifold 20 and manifold plate 22, and into mold plate 24. In such an assembly, hot runner manifold 20 is sandwiched between manifold plate 22 and manifold backing plate 18 with a manifold insulator 25 for supporting the rear face of the manifold and the nozzle housing 16 supporting the forward face of the manifold. The manifold insulator 25 is constructed from a material having a low thermal conductivity such as titanium or ceramic, such that a minimum amount of heat is transferred from hot runner manifold 20 to manifold backing plate 18.

Nozzle housing 16 is substantially conically shaped having a center bore 26 extending through the longitudinal length thereof. Housing 16 is located in a bore 27 in manifold plate 22 and includes a centering insulator 28 made of a poor conductive material, serving to locate nozzle housing 16 centrally in manifold plate bore 27. Disk springs 31 are positioned within a portion of the bore between manifold plate 22 and nozzle housing 16, to push against nozzle housing 16 for providing a plastic sealing force between nozzle housing 16 and manifold 20.

Center bore 26 of nozzle housing 16 is aligned with a bore 30 through manifold 20 through which valve stem 14 passes. The center lines of bores 26 and 30 and accordingly valve stem 14 are offset from gate 39. In addition to central bore 26, nozzle housing 16 includes a channel 32 branching off center bore 26 which forms a melt channel which is in alignment with melt channel 34 extending diagonally through manifold 20. Melt channels 32 and 34 are connected at a matching contoured area 33 for achieving uninhibited flow of melt into bore 26.

The portion of valve stem 14 extending into housing 16 includes a groove 36 which is in communication with melt channel 32 at connection 35 for receiving molding material from manifold 20. Groove 36 progresses along valve stem 14 into an adjacent position with mold gate 39 for delivering melt to the mold. Groove 36 progresses through valve stem 14 positioned in nozzle housing 16 to gate end 43 of nozzle housing 16, which groove 36 is downsized to a smaller groove 40. Smaller groove 40 is eccentrically located in valve stem 14 and is adapted to be positioned into and out of fluid communication or alignment with mold gate 39 via rotation mechanism 12. Adjacent gate end 43 of nozzle housing 16, a sealing ring 38 is positioned around the periphery of the nozzle housing for providing a diametrical seal between gate end 43 of the nozzle housing 16 and mold gate 39.

Rotation mechanism 12 is positioned in a bore 41 in manifold backing plate 18, similar to the positioning of nozzle housing 16 in manifold plate 22. Rotation mechanism 12 includes a cylindrical fixed cap 42 having a flange portion fastened to wall 45 of a counter bore 47 of bore 41 within manifold backing plate 18. Fixed cap 42 is substantially cylindrical in shape forming an outer cylindrical sleeve within bore 41. The rotation mechanism also includes an inner sleeve or piston 44 slidingly affixed within the inner wall of fixed cap 42. Inner sleeve 44 is also substantially cylindrical in shape having a flange 46 which extends outwardly past the diameter of the main body portion of the piston so as to slidably engage the inner surface of bore 41. Flange 46 forms two parallel and substantially axially transverse faces 48 and 50. For moving inner sleeve or piston 44 through fixed cap or outer sleeve 42, pressurized air is directed against one of faces 48 and 50, depending upon the direction of movement desired of inner sleeve 44, which is dependent upon the need to open or close the rotary gate valve.

Figure 2:
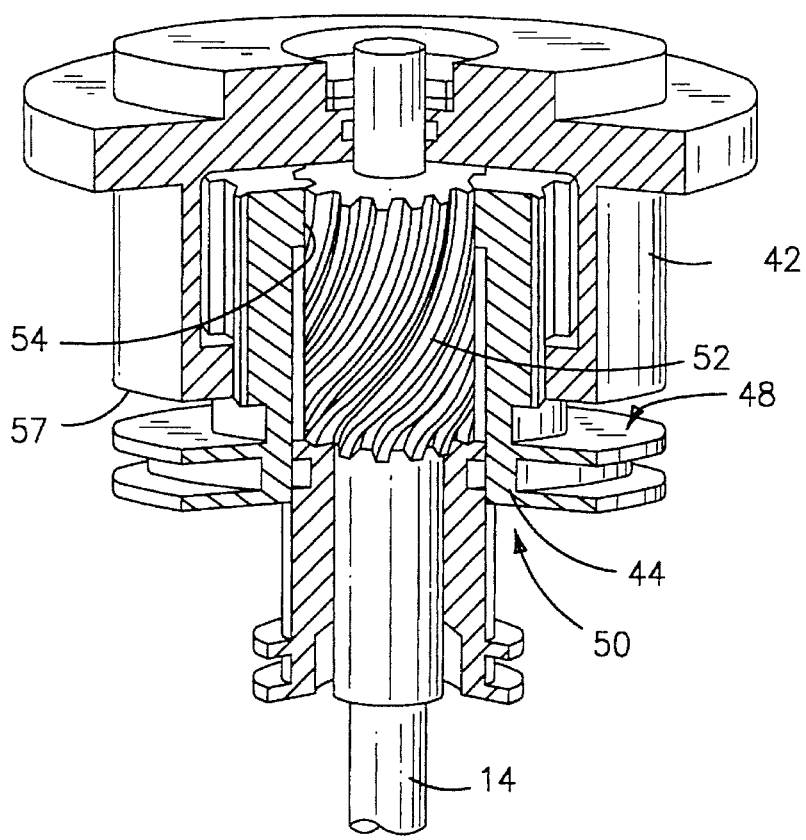
FIG. 2 is a pictorial overhead view of one embodiment of the mechanism for rotating the valve into an open and closed position.

Referring to FIG. 2 and in order to achieve rotation of valve stem 14, valve stem 14 includes a helical spline 52 adapted to engage a helical spline 54 contoured in the inner surface of inner sleeve 44. Accordingly, upon movement of piston 44 through fixed cap 42, helical spline 52 of valve stem 14 engages helical spline 54 of inner sleeve 44 causing valve stem 14 to rotate. The complimentary engagement of the helical splines causes valve stem 14 to rotate clockwise or counterclockwise depending upon whether or not the rotary actuated valve is to be opened or closed.

Figure 3:
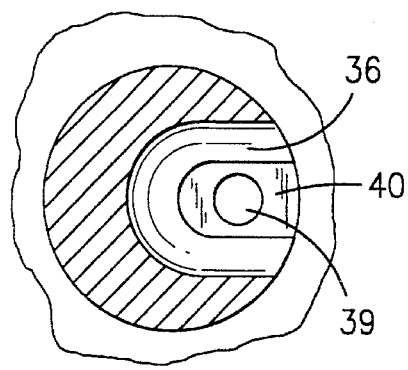
FIG. 3 is a cross-sectional view taken along line 3—3 of FIG. 1.

In operation, and referring to FIG. 1, the rotary actuated gate valve is used by heating plastic and moving the plastic through manifold 20 via melt channel 34. The melted plastic is pushed from angular melt channel 34 into angular melt channel 32 within nozzle housing 16. The molten plastic is transferred from melt channel 32 into groove 36 through valve stem 14 and into eccentrically positioned smaller groove 40 of valve stem 14. If valve stem 14 is positioned in alignment with gate 39 via rotation mechanism 12, as shown in FIG. 3, the molten plastic will pass from groove 40 into gate 39.

Figure 4:
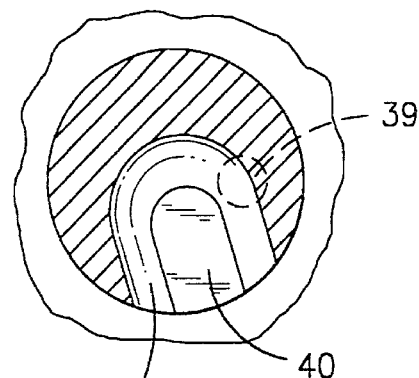
FIG. 4 is a view similar to FIG. 3 showing the rotary valve being rotated for closing the flow path.

In order to rotate valve stem 14 and groove 40 into a closed or open position with respect to mold gate 39, i.e., aligning groove 40 with gate 39, pressurized air is supplied to one of the piston faces. The valve is shown in the open position in FIGS. 1 and 3, and in order to move the valve into the closed position, pressurized air is forced against rearward face 48 causing a forward stroke of the piston. As piston 44 moves forward, helical splines 52 and 54 intermesh causing valve stem 14 to rotate. Rotation is terminated when forward face 50 of piston 44 abuts bottom edge 55 of bore 41. With this sequence, groove 40 is rotated out of alignment as shown in FIG. 4. To open the valve, i.e., placing groove 40 in alignment with gate 39, as shown in FIGS. 1 and 3, air is applied to forward face 50 of piston 44 causing the stem to rotate and return to the position shown in FIG. 1. When rearward face 48 abuts rear circular edge portion 57 of fixed cap 42, rotation is terminated and the valve is placed in the open position as shown in FIG. 3.

Figure 5:
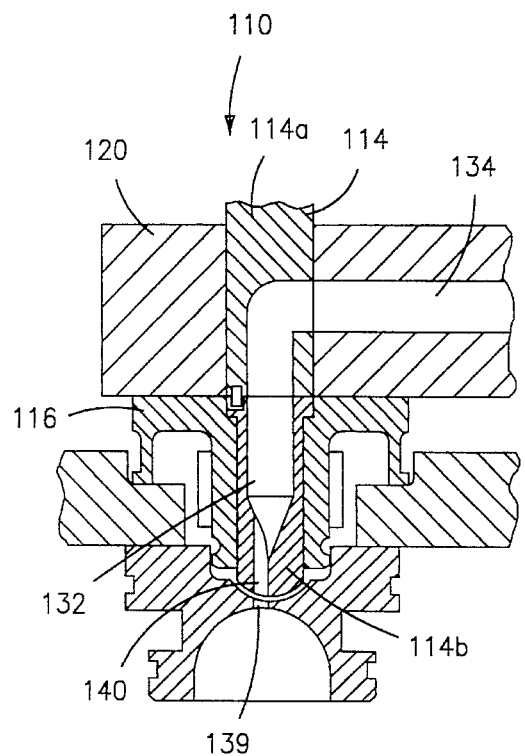
FIG. 5 is another embodiment of the invention wherein the melt flow path is positioned perpendicular to a channel within the valve stem and is shown in the open position.
Figure 6:
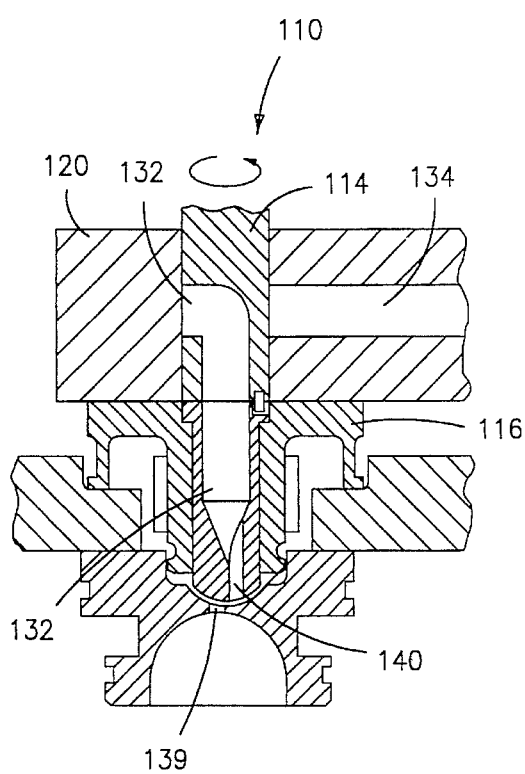
FIG. 6 is a view similar to FIG. 5 showing the valve in the closed position.

An alternative embodiment 110 is shown in FIGS. 5 and 6 for conveying the plastic melt from manifold melt channel 134 to melt channel 132 and eccentrically positioned groove 140 to mold gate 139. In this embodiment, melt channel 132 is contained entirely inside centrally offset valve stem 114 positioned housing 116 and as such melt channel 132 is maintained in a vertical orientation right up to mold gate 139. In this embodiment, valve stem 114 may be made in two pieces 114a and 114b so that the entire valve system will allow for thermal expansion and sliding of manifold 120. FIG. 5 is indicative of valve stem portions 114a and 114b in the open position and FIG. 6 is indicative of valve stem portions 114a and 114b in the closed position. For the FIGS. 5 and 6 embodiment, the same rotational mechanism as discussed above for FIG. 1 is used. With reference to FIG. 6, when valve stem 114a is rotated, melt channel 132 is rotated out of alignment with melt channel 134 cutting off the flow of plastic melt and moving eccentrically positioned smaller groove 140 out of alignment with gate 139.

Figure 7:
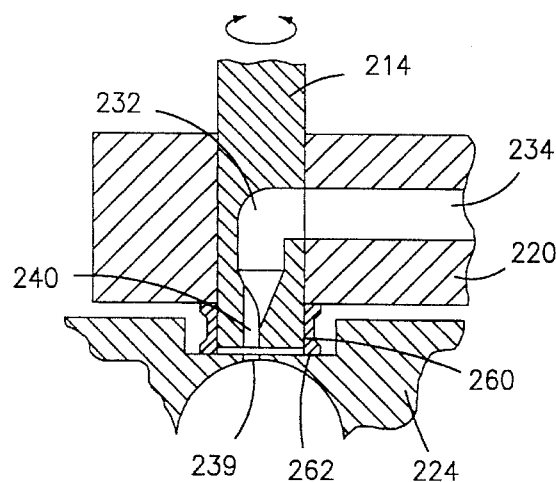
FIG. 7 is another embodiment of the present invention similar to FIGS. 5 and 6 but without a valve stem housing.

FIG. 7 shows an embodiment similar to FIGS. 5 and 6 with the exception that there is no traditional nozzle housing employed. As with the embodiment in FIGS. 5 and 6, valve stem 214 acts as the melt channel and the gate shutoff means simultaneously. Valve stem 214 extends through manifold 220, up to and adjacent to the mold cavity. Similar to FIGS. 5 and 6, the valve stem includes melt channel 232 extending longitudinally therethrough. Melt channel 232 is in fluid communication with melt channel 234 through manifold 220 which runs substantially perpendicular to melt channel 232. Similar to as described above, melt channel 232 progresses into a smaller eccentrically positioned groove 240 which is adapted to be moved into and out of alignment with gate 239 via rotation of the valve stem. An insulator or spacer 260 is positioned over the end of valve stem 214 between manifold 220 and mold plate 224 and spans the distance therebetween. A space is left between the end of valve stem 214 and gate 239, enclosed by insulator or spacer 260. Insulator or spacer 260 extends over this space functioning to form a seal between valve stem 214 and mold plate 224. As manifold 220 becomes heated and expands thermally, insulator or spacer 260 is adapted to slide laterally along its forward surface 262 on plate 224 adjacent gate 239. As with FIGS. 5 and 6 and the embodiment disclosed, the same valve stem rotational drive unit is used for this embodiment as described for FIG. 1.

Figure 9:
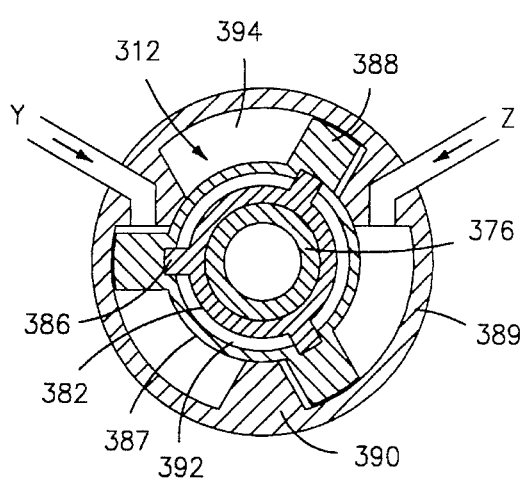
FIG. 9 is a cross-sectional view taken along line 9—9 of FIG. 8.
Figure 8:
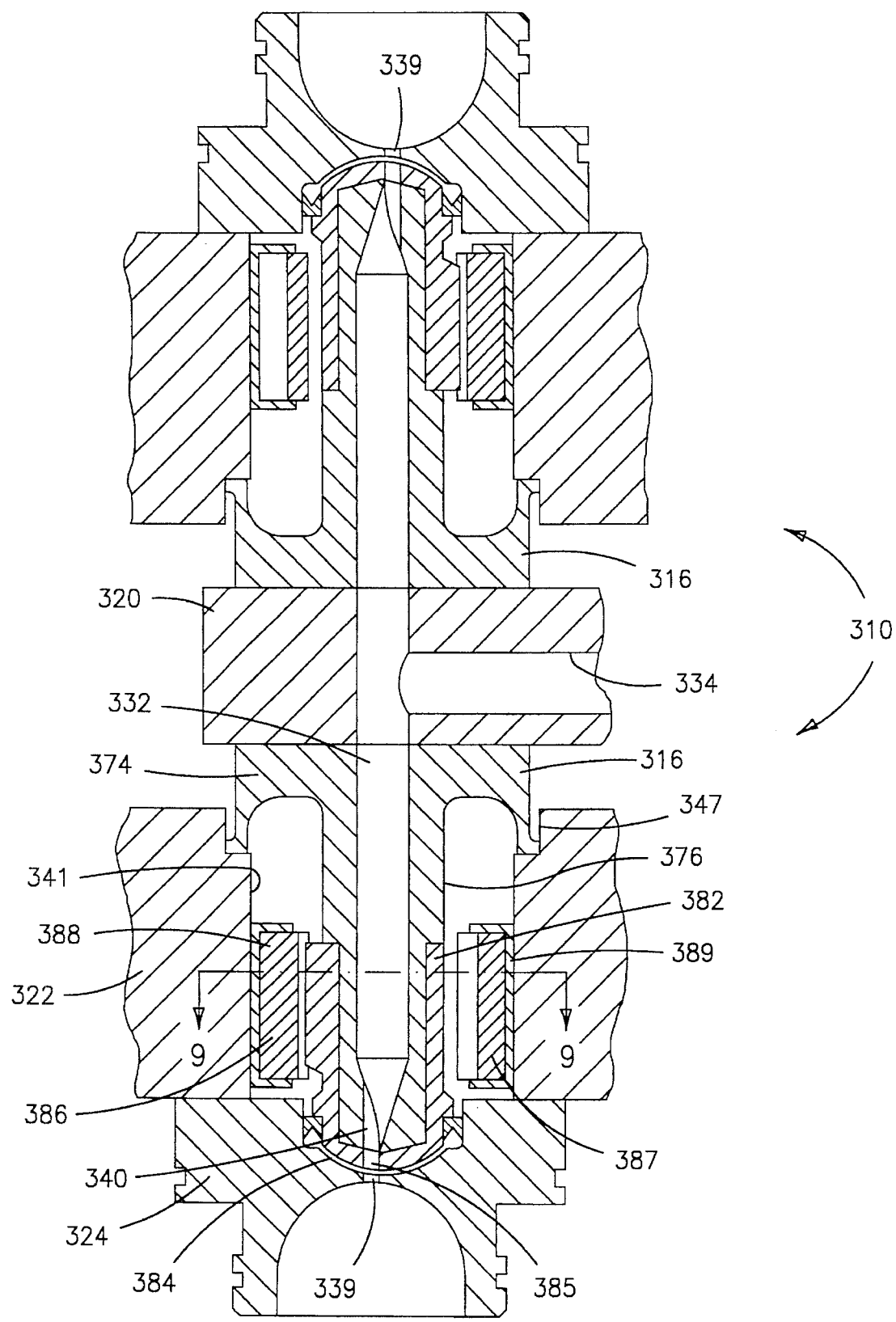
FIG. 8 is yet another embodiment of the present invention for use with mold hot runners where nozzles are placed opposite each other, also including a new embodiment of the rotary actuation mechanism.

Referring now to FIGS. 8 and 9, another embodiment 310 of the rotary actuated gate valve is disclosed. The embodiment shown in FIGS. 8 and 9 is ideal for stack mold hot runners, where nozzles are placed opposite each other on opposite faces of manifold 320. In this embodiment, rotational mechanism 312 (See FIG. 9) is positioned coaxially with relation to nozzle housing 316 so that minimal longitudinal space is used. Valve 310 can be used either singularly or in the opposing relationship as shown in FIG. 8.

For clarity, only the elements comprising one of the opposed valves is described in detail. However, the description applies to both valves shown in FIG. 8.

As with the above main embodiment, nozzle housing 316 fits within cylindrical bore 341 and counterbore 347 in manifold plate 322 and extends toward gate 339. Bore 341 is adapted to engage the rotational mechanism of this embodiment while counterbore 347 is adapted fixedly to engage an outer portion of nozzle housing 316 comprised of circular element 374 having a wider diameter than cylindrical element 376. Housing 316 includes a longitudinal bore or melt channel 332 therethrough communicating with melt channel 334 of manifold 320 and with mold gate 339 and extending into mold plate 324, wherein the center line of melt channel 332 is offset from the center of gate 339. Melt channel 332 extends through housing 316, progressing into smaller groove 340 adapted to directly connect channel 332 with gate 339. Smaller groove 340 is eccentrically positioned in element 376, offset from the center of channel 332, such that upon rotation of nozzle housing 316, all of groove 340 is rotated out of alignment with gate 339.

Rotational mechanism 312 comprises a combination of an end cap 382 positioned over and engaging cylindrical element 376 of nozzle housing 316. End cap 382 extends approximately half the length of element 376, is substantially cylindrical in shape and receives element 376 in a coaxial manner. End cap 382 has one substantially closed end 384 with an orifice 385 therein adapted to be moved into and out of alignment with mold gate 339. End cap 382 includes three ribs 386, best shown in FIG. 9, extending outwardly from the circumference thereof. Ribs 386 are spaced at 120° from each other on the outer circumferential wall of end cap 382. Ribs 386 engage an inner surface of a cylindrical inner sleeve 387 via slots positioned therein in a spaced relationship equal to the spacing of ribs 386 of end cap 382. Inner sleeve 387 includes ribs 388 which extend from the circumference thereof and are wider than ribs 386, functioning to guide inner sleeve 387 within an outer sleeve 389. Inner sleeve 387 is insulated from direct heat from nozzle housing 316 and end cap 382 via air spaces 392 and 394.

Outer sleeve 389 is also substantially cylindrical in shape and is positioned coaxially with relation to inner sleeve 387 and is adapted to be secured in bore 341 of manifold plate 322. Outer sleeve 389 includes an inner and outer wall wherein the inner wall includes ribs 390 extending inwardly therefrom substantially to the outer wall of inner sleeve 387. Each of ribs 390 are adapted to loosely engage the outside circumference of inner sleeve 387, for causing inner sleeve 387 to be axially secured within outer sleeve 389 and freely rotatably movable therein.

Ribs 388 of inner sleeve 387 are adapted to engage ribs 390 of outer sleeve 389. Accordingly, upon rotation of inner sleeve 387, the angular displacement of the inner sleeve is limited by the contact of ribs 390 with ribs 388 of inner sleeve 387.

For accomplishing the aforementioned rotation of inner sleeve 387, two of ribs 390 include inlets Y and Z therein vented through outer sleeve 389 for directing pressurized air from an air source (not shown) against ribs 388 of inner sleeve 387. Accordingly, to rotate inner sleeve 387 counterclockwise, inlet Y is used to direct air against one of ribs 388 and in order to rotate inner sleeve 387 clockwise, inlet Z is used to direct pressurized air against one of the ribs 388. By directing air through inlets Y and Z, respectively, groove 340 and orifice 385 are rotated into and out of alignment with gate 339 of mold plate 324.

A coaxial rotational mechanism similar to as described above can also be implemented with the above embodiments using valve stem, such as by replacing the rotational mechanism 12 of FIG. 1 and having the coaxial mechanism engage the stem instead of the housing.

The primary advantage of this invention is that a rotary actuated gate valve is provided which is simply constructed and space efficient. Another advantage of this invention is that a rotary actuated gate valve is provided which eliminates weld seams. Still another advantage of this invention is that a rotary actuated gate valve is provided having noninhibited melt flow paths. Yet another advantage of this invention is that a rotary actuated gate valve is provided having a compact design which is particularly useful for stack mold hot runners. And yet another advantage of this invention is that a rotary actuated gate valve is provided which is economical to manufacture.

It is apparent that there has been provided in accordance with this invention a rotary actuated gate valve which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A rotary actuated gate valve system for directing melt from a manifold channel to a mold gate,
   a valve stem extending through and rotatable within the manifold, said valve stem including a means for receiving the melt from the manifold channel, wherein the means for receiving is in fluid communication with the manifold channel and is adapted to be rotated into alignment with the mold gate for allowing the melt to flow into the mold gate and the means for receiving is adapted to be rotated out of alignment with the mold gate for blocking the melt from flowing into the mold gate; and
   means for rotating the valve stem, said means for rotating positioned coaxially relative to the valve stem.

2. A rotary actuated gate valve system according to claim 1, wherein the means for receiving is a groove in fluid communication with the manifold channel, wherein the groove is further adapted to be rotated into alignment with the manifold channel and the groove is further adapted to be rotated out of alignment with the manifold channel.

3. The rotary actuated gate valve system according to claim 2, further including a housing including a channel means for receiving the melt from the manifold channel and directing the melt to the groove.

4. The rotary actuated gate valve system according to claim 2, wherein the groove extends longitudinally through the valve stem and includes a portion extending substantially transverse thereto through which melt flow is adapted to enter the groove from the manifold channel.

5. The rotary actuated gate valve system according to claim 2, wherein the groove includes a wide portion adjacent the manifold channel and a narrow portion adjacent the gate.

6. The rotary actuated gate valve system according to claim 2, wherein the valve stem is off center relative the mold gate and at least a portion of the groove is eccentrically located in the valve stem.

7. The rotary actuated gate valve system according to claim 1, wherein the means for rotating is connected to the valve stem.

8. The rotary actuated gate valve system according to claim 7, wherein the means for rotating includes an inner sleeve which comprises the portion and an outer sleeve, the inner sleeve being connected to the valve stem and under the force of the pressurized fluid reciprocating within the outer sleeve, wherein such reciprocation and the connection with the valve stem induces rotation to the valve stem.

9. The rotary actuated gate valve system according to claim 8, wherein the inner sleeve includes an inner contoured surface engagable with a cooperating contoured surface of the valve stem, wherein the reciprocation of the inner sleeve within the outer sleeve causes the contoured surfaces to mesh and rotate the valve stem.

10. The rotary actuated gate valve system according to claim 9, wherein the contoured surfaces are cooperating helical splines.

11. The rotary actuated gate valve system according to claim 1, further including a housing, wherein the valve stem comprises two portions and the housing encloses one of the portions.

12. A rotary actuated gate valve system according to claim 1, further comprising spacer means positioned between the valve stem and mold gate for creating a seal therebetween, wherein the spacer means is positioned on an end of the valve stem and between the manifold and the mold gate.

13. A rotary actuated gate valve system according to claim 1, wherein the means for rotating is in axial alignment with the direction of plastic flow through the nozzle housing.

14. The rotary actuated gate valve system according to claim 1, wherein said member includes two rotatable housings each including a means for rotating, wherein the two rotatable housings are positioned opposite each other adjacent opposing sides of the manifold.

15. The rotary actuated gate valve system according to claim 14, wherein the two rotatable housings share the same manifold channel.

16. A rotary actuated gate valve system for directing melt from a manifold channel to a mold gate, comprising:
   a valve stem extending through and rotatable within the manifold, said valve stem including a means for receiving the melt from the manifold channel, wherein the means for receiving is in fluid communication with the manifold channel and is adapted to be rotated into alignment with the mold gate for allowing the melt to flow into the mold gate and the means for receiving is adapted to be rotated out of alignment with the mold gate for blocking the melt from flowing into the mold gate; and
   means for rotating the valve stem, said means for rotating positioned coaxially relative to the valve stem, wherein the means for rotating includes a portion adapted to have a pressurized fluid directed thereagainst.

17. A rotary actuated gate valve system for directing melt from a manifold channel to a mold gate, comprising:
   a rotatable housing including a means for receiving the melt from the manifold channel wherein the housing is rotatable along an axis parallel to a longitudinal axis of the mold gate and wherein the means for receiving is in fluid communication with the manifold channel and is adapted to be rotated into alignment with the mold gate for allowing the melt to flow into the mold gate and the means for receiving is adapted to be rotated out of alignment with the mold gate for blocking the melt from flowing into the mold gate; and
   means for rotating the housing, said means for rotating positioned coaxially relative to the housing.

18. The rotary actuated gate valve system according to claim 17, wherein the means for receiving is a groove extending through the housing.

19. The rotary actuated gate valve system according to claim 18, wherein the groove includes a wide portion located adjacent the manifold channel and a narrow portion located adjacent the gate.

20. The rotary actuated gate valve system according to claim 18, wherein the longitudinal center of the housing is off center relative the center of the mold gate and at least a portion of the groove is eccentrically located in the housing.

21. A rotary actuated gate valve system for directing melt from a manifold channel to a mold gate, comprising:

a housing including a means for receiving the melt from the manifold channel, wherein the means for receiving is in fluid communication with the manifold channel and is adapted to rotate into alignment with the mold gate for allowing a melt to flow into the mold gate and the means for receiving is adapted to be rotated out of alignment with the mold gate for blocking the melt from flowing into the mold gate; and an outer sleeve adapted to be substantially nonrotatable relative to the housing and a rotatable inner sleeve comprising a portion adapted to have a pressurized fluid directed thereagainst, wherein the inner sleeve is coaxially connected with the housing and is adapted to rotate within the outer sleeve via the pressurized fluid for rotating the housing.

22. The rotary actuated gate valve system according to claim 21, wherein the inner sleeve includes an outer surface which engages a cooperating inner surface of the outer sleeve.

23. The rotary actuated gate valve system according to claim 22, wherein the inner and outer surfaces are cooperating ribs.

24. The rotary actuated gate valve system according to claim 21, wherein the means for rotating further includes an end cap which coaxially engages the housing and wherein the inner sleeve engages the end cap.

25. The rotary actuated gate valve system according to claim 24, wherein the inner sleeve is secured to the end cap via cooperating surfaces.

26. The rotary actuated gate valve system according to claim 25, wherein the cooperating surfaces includes engaging slots and ribs.

27. The rotary actuated gate valve system according to claim 21, wherein the outer sleeve includes an inner wall having a plurality of ribs extending inwardly therefrom, and the inner sleeve includes an outer wall including a plurality of ribs extending outwardly therefrom, wherein upon rotation of the inner sleeve the ribs of the inner sleeve are adapted to be moved into contact with the ribs of the outer sleeve for stopping the movement of the means for receiving into and out of alignment with the mold gate.

28. The rotary actuated gate valve system according to claim 27, wherein the outer sleeve includes a first inlet adapted to receive a pressurized fluid, and wherein the first inlet is adapted to direct the fluid against a rib of the inner sleeve for rotating the inner sleeve in a first direction, and the outer sleeve includes a second inlet adapted to receive pressurized fluid, wherein the second inlet is adapted to direct the fluid against a rib of the inner sleeve for rotating the inner sleeve in a second direction.

29. A rotary actuated gate valve system, for directing melt from a manifold channel to a mold gate, comprising:

two rotatable housings each including a means for rotating, wherein the two rotatable housings are positioned opposite each other adjacent opposing sides of the manifold and wherein each of said two rotatable housings includes a means for receiving the melt from the manifold channel, wherein the means for receiving is in fluid communication with the manifold channel and is adapted to be rotated into alignment with the mold gate for allowing the melt to flow into the mold gate and the means for receiving is adapted to be rotated out of alignment with the mold gate for blocking the melt from flowing into the mold gate; and said means for rotating the housings, said means for rotating positioned coaxially relative to the housing, wherein the means for rotating include a portion adapted to have a pressurized fluid directed thereagainst.

30. The rotary actuated gate valve system according to claim 29, wherein the two rotatable housings share the same manifold channel.

* * * * *

UNITED STATES PATENT AND TRADEMARK OFFICE
CERTIFICATE OF CORRECTION

PATENT NO. : 5,499,916
DATED : March 19, 1996
INVENTOR(S) : ROBERT D. SCHAD ET AL.

It is certified that error appears in the above-indentified patent and that said Letters Patent is hereby corrected as shown below:

In Column 5, line 11, after "positioned"
--in-- should be inserted; and

In Column 7, claim 1, line 23, after "gate,"
--comprising:-- should be inserted.

Signed and Sealed this

Twenty-third Day of July, 1996

Attest:

BRUCE LEHMAN

Attesting Officer

Commissioner of Patents and Trademarks